United States Patent [19]

Kobayashi et al.

[11] 4,036,193
[45] July 19, 1977

[54] ELECTRONICALLY CONTROLLED FUEL INJECTION PUMP

[75] Inventors: Masayoshi Kobayashi, Kawagoe; Takeo Kimura, Higashi-Matsuyama, both of Japan

[73] Assignee: Diesel Kiki Kabushiki Kaisha, Japan

[21] Appl. No.: 575,077

[22] Filed: May 6, 1975

Related U.S. Application Data

[63] Continuation-in-part of Ser. No. 274,655, July 24, 1972, abandoned.

[30] Foreign Application Priority Data

July 30, 1971  Japan ............................. 46-67266[U]

[51] Int. Cl.² ............................................ F02M 39/00
[52] U.S. Cl. .......................... 123/139 AB; 123/139 AZ; 123/139 E; 123/140 A; 417/289
[58] Field of Search ..... 123/139 AB, 139 E, 139 AD, 123/139 AL, 139 BC, 139 BD, 139 BE, 140 A, 139 AZ; 417/289

[56] References Cited

U.S. PATENT DOCUMENTS

| 2,852,308 | 9/1958 | Whitson | 123/32 AE |
|---|---|---|---|
| 3,058,455 | 10/1962 | Hoper | 123/139 BD |
| 3,407,793 | 10/1968 | Lang | 123/32 EA |
| 3,630,177 | 12/1971 | Engel | 123/139 E |
| 3,630,643 | 12/1971 | Eheim | 123/139 E |
| 3,638,631 | 1/1972 | Eheim | 123/140 A |
| 3,665,907 | 5/1972 | Laufer | 123/139 E |
| 3,724,436 | 4/1973 | Nagata et al. | 123/32 AE |
| 3,777,731 | 12/1973 | Kobayashi et al. | 123/139 BD |
| 3,827,409 | 8/1974 | O'Neill | 123/139 E |
| 3,880,131 | 4/1975 | Twaddell et al. | 123/139 E |
| 3,897,762 | 8/1975 | Jones et al. | 123/139 E |

Primary Examiner—Carroll B. Dority, Jr.
Assistant Examiner—Paul Devinsky
Attorney, Agent, or Firm—Larson, Taylor and Hinds

[57] ABSTRACT

A plunger is reciprocable in a barrel to force fuel to the injection nozzles. The portion of the barrel defining with the plunger the compression chamber is movable and is formed with a port leading to the unpressurized fuel reservoir in such a manner that the plunger uncovers the port at the end of its fuel injection stroke to overflow fuel from the compression chamber to the reservoir and terminate fuel injection. The position of the movable portion of the barrel and thereby the port relative to the plunger determines the fuel injection volume. A closed loop electronic servo system is provided to position the movable part of the barrel in accordance with the required fuel injection volume.

9 Claims, 5 Drawing Figures

ELECTRONICALLY CONTROLLED FUEL INJECTION PUMP

The present application is a continuation-in-part of the copending application Ser. No. 274,655 filed July 24, 1972, now abandoned entitled "Distribution-Type Fuel Injection Pump For An Internal Combustion Engine".

The present invention relates to an electronically controlled fuel injection pump especially suited for a Diesel engine.

Many fuel injection pumps are known in the prior art including unit injection, combination and distribution types. All of these pumps comprise a plunger reciprocally slidable in a barrel to force fuel to an injection nozzle. In addition, all of these pumps utilize the overflow principle to terminate fuel injection at a controllably adjustable point to provide the required fuel injection volume. The barrel is formed with a port leading to the unpressurized fuel reservoir in such a manner that the plunger uncovers the port at the end of the plunger fuel injection stroke to overflow fuel from a compression chamber defined within the barrel by the end of the plunger to the reservoir. The plunger is formed with a helical groove whereby the overflow point is determined by the rotational position of the plunger relative to the barrel and is thereby adjustable by rotating the plunger. A pinion or pinion segment is rotatable with the plunger which meshes with a rack formed on a control rod. The fuel injection volume is thereby adjustable in accordance with the linear position of the control rod. Many means have been devised to move the control rod to the desired position, the most well known being centrifugal, pneumatic and hydraulic governors. Due to the recent advances in electronics, various electronic control units have been introduced to determine the position of the control rod such as disclosed in U.S. Pat. No. 3,407,793 to Lang.

A drawback in adjusting the fuel injection volume by means of the well known control rod mechanism is that precise control is difficult due to backlash in rack and pinion, and a comparatively large amount of mechanical force is required to move the control rod due to mechanical friction in the mechanism.

An even more important drawback is that the helical groove in the plunger must be machined with high precision, and the cost of producing the plunger is quite high, especially in the case of multicylinder engines in which a plunger is required for each cylinder.

Known fuel injection pumps, generally of the distribution type, have been devised in which the fuel injection volume is controlled by means of a movable overflow member to terminate fuel injection rather than a plunger formed with a helical groove. Electronic control units to control the movable overflow member in a satisfactorily precise manner have heretofore not been disclosed.

It is an object of the present invention to provide an electronically controlled fuel injection pump in which the plunger barrel comprises a movable portion whereby the fuel injection volume is controlled in accordance with the position of the movable portion.

It is another object of the present invention to provide an electronically controlled fuel injection pump comprising a closed loop electronic servo control unit.

The above and other objects, features and advantages of the present invention will become clear from the following detailed description taken with the accompanying drawings, in which.

Figure 1:
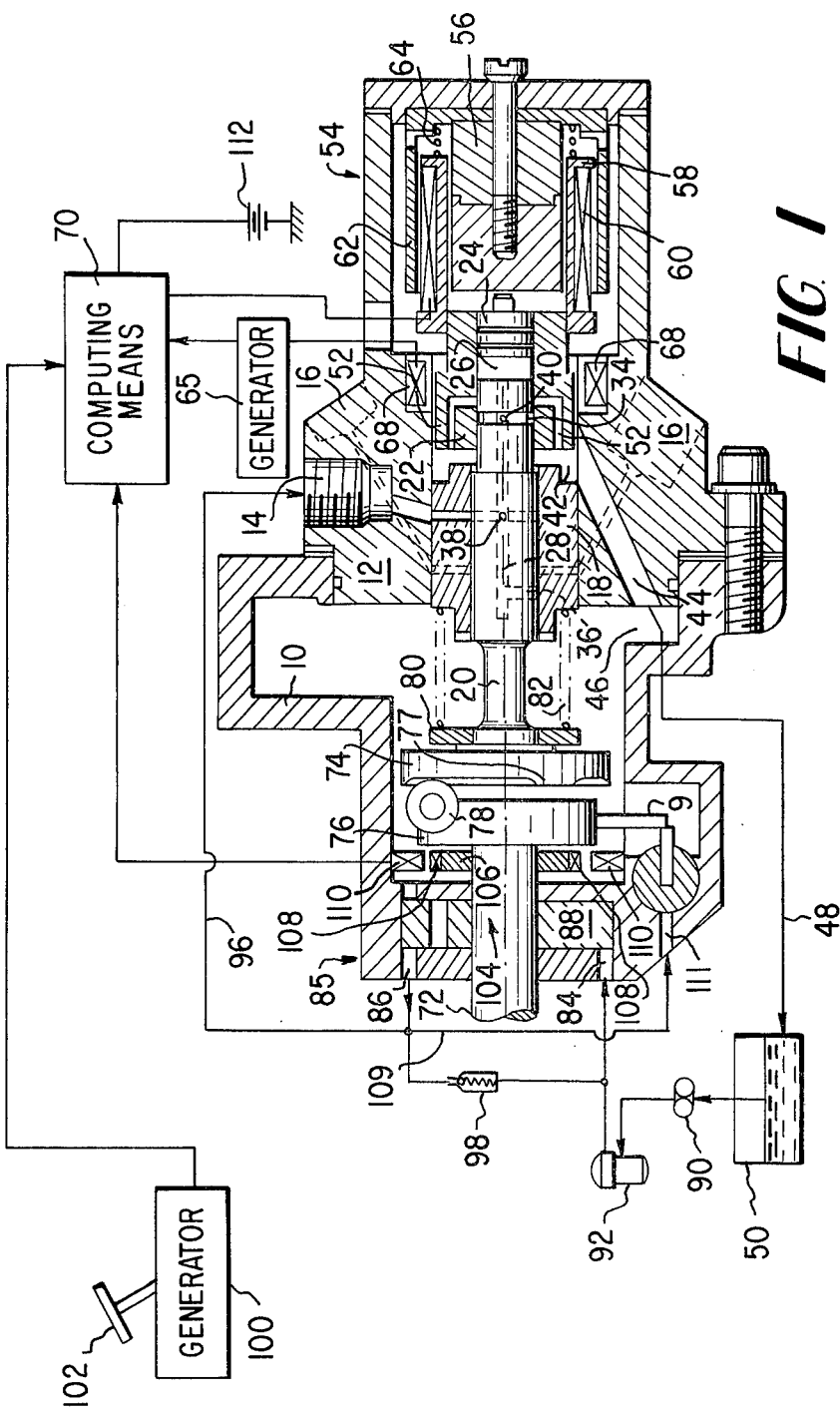
FIG. 1 is a longitudinal section of a first preferred embodiment of a fuel injection pump according to the present invention.

Referring now to FIG. 1, a fuel injection pump embodying the present invention is of the distribution type and comprises a casing 10 to which a casing head 12 is fixed. The casing head 12 is formed with a fuel inlet port 14 and four fuel outlet ports 16 (only 2 are shown). An enclosure or barrel 18 is fixed within the casing head 12, and the ports 14 and 16 extend through the wall of the barrel 18 to the bore (no numeral) of the barrel 18. A pump element or plunger 20 is sealingly rotatable and reciprocally slidable in the barrel 18 in the left-right direction as shown in FIG. 1. A movable overflow member 22 constituting a movable part of the barrel 18 is movable left and right along the same axis as the barrel 18. A clearance is provided between the overflow member 22 and the inner surface of the casing head 12. A plug 24 is sealingly slidable in the bore of the overflow member 22 and part of the plunger 20 including the right end thereof is sealingly slidable in the bore of the overflow member 22. A compression chamber 26 is defined within the overflow member 22 by the right end of the plunger 20 and the left end of the plug 24.

The plunger 20 is formed with an axial passageway 28 opening into the compression chamber 26 and radial passageway 38 and 40 communicating with the axial passageway 28 respectively. A radial passageway 36 is communicable with the outlet ports 16. An overflow chamber 42 is defined between the barrel 18 and overflow member 22 which leads to an unpressurized fuel reservoir 50 through a passageway 44, a chamber 46 and a line 48. Overflow passageways 52 lead from the bore of the overflow member 22 into the overflow chamber 42. The radial passageway 36 and radial passageway 38 and annular grooves 34 align with the outlet ports 16, the inlet port 14 and the overflow passageways 52 respectively at various positions of the plunger 20 as will be described in detail below.

An electrical actuator 54 in the form of a solenoid comprises a magnetic core 56 fixed to the right end of the casing head 12. A bobbin 58 fixed to the right end of the overflow member 22 is wound with a solenoid coil 60 constituting a linearly movable actuator element. A guide cup 62 fixed to the casing head 12 is provided for the bobbin 58. A compression spring 64 urges the bobbin 58 and thereby the movable overflow member 22 leftward.

A position feedback sensor is provided which comprises a coil 68 fixed to the casing head 12. The coil 68 is connected through a generator 65 to a computing means 70, the output of which is connected to the solenoid coil 60.

A drive shaft 72 is connected to an engine (not shown) for rotation at a speed proportional to the engine speed. A cam disc 74 is splined to the right end of the drive shaft 72. A disc 76 carrying a roller 78 is fixed within the casing 10 by a pin 9. The roller 78 engages with the left surface of the cam disc 74 which constitutes a cam surface.

An engaging disc 80 is fixed to the left end of the plunger 20 and held in engagement with the cam disc 74 by a compression spring 82 disposed between the disc 80 and the fixed barrel 18.

An impeller 88 eccentrically fixed to the drive shaft 72 is rotatable within the casing 10 to constitute a low pressure pump 85 having an inlet port 84 and an outlet port 86. A feed pump 90 pumps fuel from the reservoir 50 through a filter 92 and a line 94 to the inlet 84. The outlet 86 is connected through a line 96 to the inlet 14 of the fuel injection pump and through a line 109 to an advance mechanism port 111.

A regulating valve 98 comprising a ball and a spring (no numerals) is connected between the lines 96 and 94 to control the fuel pressure in a manner as to maintain the maximum pressure constant. The outlets 16 of the fuel injection pump are connected to fuel injection nozzles of the engine which do not constitute the subject matter of the present invention and are not shown.

An engine speed command signal generator 100 which may be a potentiometer is adjustable by means of an engine accelerator pedal 102. The output of the generator 100 is fed to the computing means 70 is the form of an engine speed command signal. The pump further comprises an engine speed sensor in the form of a tachometer 104 which includes a disc 106 fixed to the drive shaft 72. Magnetic poles 108 are fixed to the edge of the disc 106. A coil 110 is fixed to the casing 10 adjacent to the disc 106, and the output of the coil 110 is connected to the computing means 70. The computing means 70 is powered by an engine battery 112.

Figure 3:
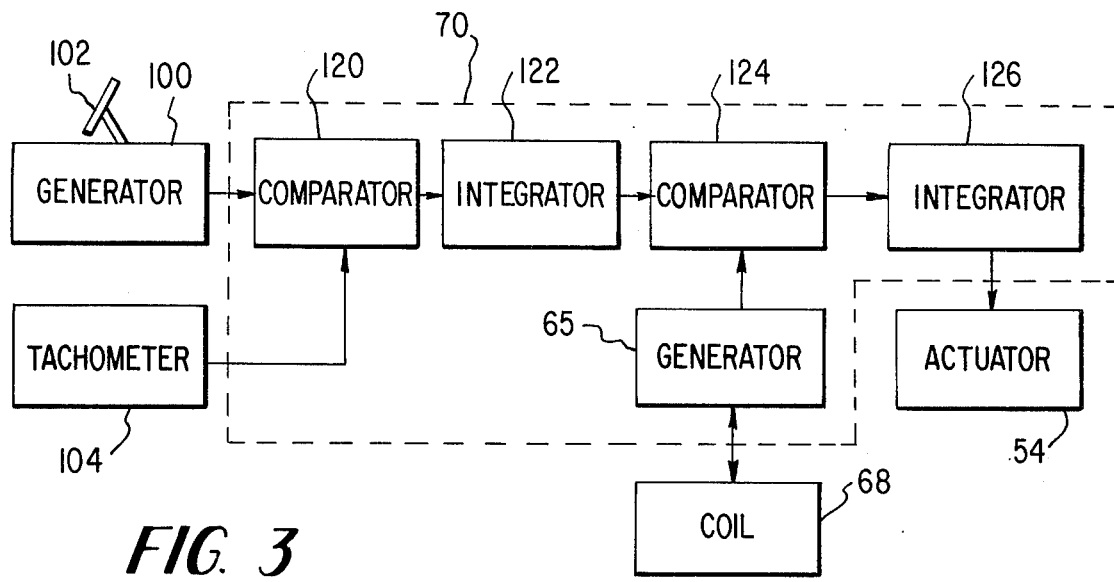
FIG. 3 is an electrical block diagram of a closed loop electronic servo control system to control the fuel injection volume of the pump shown in FIG. 1.

The computing means 70 is shown in FIG. 3 as comprising a command signal generator to generate a command signal corresponding to the required fuel injection volume which includes a comparator 120 and an integrator 122. The outputs of the generator 100 and the tachometer 104 are connected to inputs of the comparator 120, and the output of the comparator 120 is connected to the input of the integrator 122. The comparator 120 may be embodied by any electronic circuitry such as a differential amplifier to generate a suitable signal in response to the difference between the signals from the generator 100 and tachometer 104. The integrator 122 may comprise an operational amplifier or a capacitor and a resistor connected in series. Such circuits are well known in the art and are not shown.

The computing means 70 further comprises a command signal generator to generate a command signal designating the position of the overflow member 22 corresponding to the required fuel injection volume which includes a comparator 124 and an integrator 126 similar in construction to the comparator 120 and the integrator 122 respectively. The outputs of the integrator 122 and the generator 65 are connected to inputs of the comparator 124. The output of the comparator 124 is connected to the input of the integrator 126, the output of which is connected to the coil 60 of the actuator 54. Preferably, the time constant of the integrator 126 is shorter than that of the integrator 122.

In operation, the drive shaft 72 is rotated from the engine and fuel from the reservoir 50 is supplied through the pump 90, filter 92 and pump 85 to the inlet 14 of the fuel injection pump. The disc 80 is maintained in contact with the cam disc 74 by the spring 82 so that the drive shaft 72, cam disc 74, disc 80 and plunger 20 rotate in a unitary manner. The cam disc 74 is formed with four protrusions or lobes 77 (only one is completely shown) which is equal to the number of cylinders of the engine. The plunger 20 is thereby moved leftward in an intake or suction stroke to the position shown in FIG. 1 as a lobe 77 moves out of engagement with the roller 78 and is moved rightward in a compression or fuel injection stroke as a lobe 77 moves into engagement with the roller 78. This occurs four times for one revolution of the plunger 20. The radial passageway 38 of the plunger 20 aligns with the inlet port 14 during the suction stroke of the plunger 20 so that fuel from the pump 85 flows through the inlet port 14, radial passageway 38 and axial bore 128 into the compression chamber 26. The right end of the plug 24 is maintained in engagement with the left end of the core 56 by fluid pressure in the compression chamber 26.

As the plunger 20 is rotatably moved rightward during its compression stroke, the radial passageway 38 moves out of alignment with the inlet port 14 so that the plunger 20 blocks the inlet port 14. Fuel trapped in the compression chamber 26 and axial passageway 28 is compressed to high pressure during rightward movement of the plunger 20. The radial passageway 36 subsequently aligns with an outlet port 16 so that fuel from the compression chamber 26 is fed to one of the fuel injection nozzles through the axial passageway 28, radial passageway 36, and outlet port 16. The radial passageway 36 aligns with the four outlet ports 16 during successive compression strokes of the plunger 20. During subsequent rightward movement of the plunger 20, the annular groove 34 will align with the overflow passageways 52 in the overflow member 22 so that the compression chamber 26 will be connected to the reservoir 50 through the overflow passageways 52, the overflow chamber 42, the passageway 44, the chamber 46 and the line 48. Fuel flow out of the compression chamber 26 causes rapid termination of fuel injection as is well known in the art. The position of the plunger 20 at which the compression chamber 26 is connected to the reservoir 50 depends on the position of the overflow member 22 and determines the fuel injection volume. The generator 100, tachometer 104, coil 68, generator 65 and computing means 70 constitute a closed loop electronic servo control system to set the position of the overflow member 22 to provide the required fuel injection volume.

In the operation of the servo control system, the engine operator depresses the accelerator pedal 102 to designate the desired engine speed, and the generator 100 produces the engine speed command signal corresponding thereto. The tachometer 104 produces the signal designating the actual engine speed. The comparator 120 produces an output proportional to the difference between the required engine speed and the actual engine speed which has a positive or negative polarity when the required engine speed is higher or lower than the actual engine speed to command acceleration or deceleration respectively. When the engine speed is at the required value, the output of the comparator 120 is zero.

The integrator 122 integrates the output of the comparator 120 with respect to time to produce an outut voltage which is the integral of all of the input signals applied thereto. If the output of the comparator 120 is zero, the output voltage of the integrator 122 will remain unchanged. If the output of the comparator 120 is positive, the output voltage of the integrator 122 will increase at a rate depending on the time constant thereof thereby designating a higher fuel injection volume o accelerate the engine. The output voltage of the integrator 122 decreases in response to a negative output from the comparator 120 to indicate a lower fuel injection volume to decelerate the engine.

The comparator 124 produces an output which is proportional to the difference between the outputs of the integrator 122 and the generator 65. The overflow member 22 is made of a ferromagnetic material and constitutes a movable core for the coil 68. The inductance of the combination of the coil 68 and overflow member 22 is dependent on the protrusion of the overflow member 22 into the coil 68, and provides an exact indication of the position of the overflow member 22. The generator 65 is arranged to measure the inductance of the coil 68 and feed a feedback signal to the comparator 124 as a predetermined function thereof. The spring 64 urges the overflow member 22 leftward toward a position of minimum fuel injection volume in which the inductance of the coil 68 is also minimum since the overflow member 22 is retracted to a maximum extent from the coil 68. A voltage applied to the actuator 54 is arranged to urge the overflow member 22 rightward against the force of the spring 64 to increase the fuel injection volume and also the inductance of the coil 68. The equilibrium position of the movable overflow member 22 is that at which the force exerted on the overflow member 22 by the actuator 54 is equal to the force exerted thereon by the spring 64.

The output voltage of the generator 65 is a predetermined function, preferably linear, of the inductance of the coil 68, and the output voltage range of the generator 65 is the same as that of the integrator 122.

The output of the comparator 124 is fed to the integrator 126, the output of which is connected to the actuator 54. The output voltage of the integrator 126 determines the position of the overflow member 22. Preferably, the time constant of the integrator 126 is small so that the actuator 54 will quickly respond to variations in the output of the integrator 122.

When the output of the integrator 122 and the output of the generator 65 are equal, the output of the comparator 124 is zero and the output of the integrator 126 remains constant. The overflow member 22 is thereby held in the required position. If the engine operator depresses the accelerator pedal 102 to demand a higher engine speed so that the output of the comparator 120 is positive and the output voltage of the integrator 122 increases, the comparator 124 produces a positive output causing the output voltage of the integrator 126 to increase. This causes the actuator 54 to move the overflow member 22 rightward to increase the fuel injection volume. When the overflow member 22 has moved rightward to a position at which the output of the generator 65 is equal to the output of the integrator 122, the comparator 124 will produce a zero output and the output of the integrator 126 will remain constant to hold the overflow member 22 in the new required position. When the engine speed has increased to a point whereby the outputs of the generator 100 and tachometer 104 are equal, the output of the comparator 120 will be zero so that the overflow member 22 is held in the position which provides the fuel injection volume required to maintain the engine speed at the required value. The operation for deceleration is exactly opposite to that described above for acceleration.

The servo control system may be provided with an over-, critical- or underdamped acceleration response characteristic by suitably selecting the time constant of the integrator 122 and the amplification factor of the comparator 120. In the system of the present invention, due to the closed loop configuration, non-linear amplifiers and wave shaping circuits are not required as with open loop servo systems.

Figure 4:
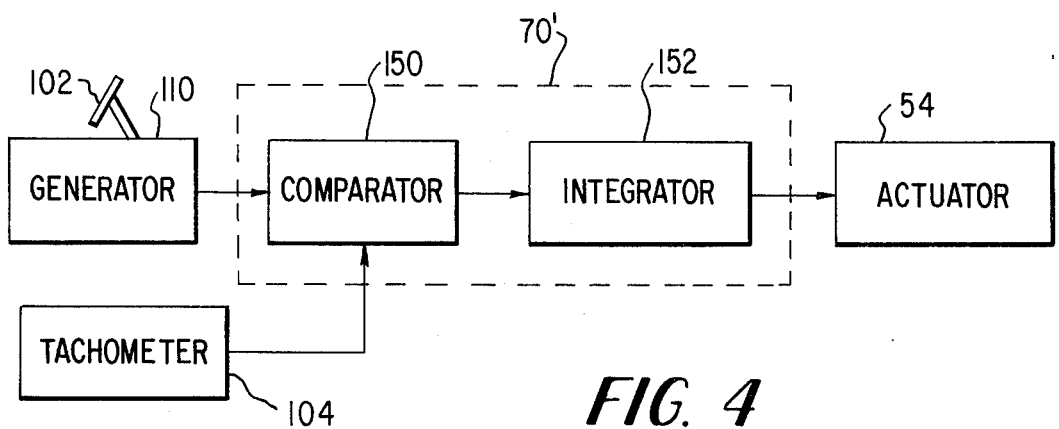
FIG. 4 is similar to FIG. 3, but shows another closed loop electronic servo control system.

Depending on the requirements of the system, a modified computing means 70' may be utilized as shown in FIG. 4. A comparator 150 and integrator 152 are similar to the comparator 120 and integrator 122 respectively. In this case, however, the output of the integrator 152 is connected directly to the actuator 54, and a position feedback signal from the overflow member 22 is not provided. This embodiment is especially preferable since it also eliminates the generator 65.

Figure 2:
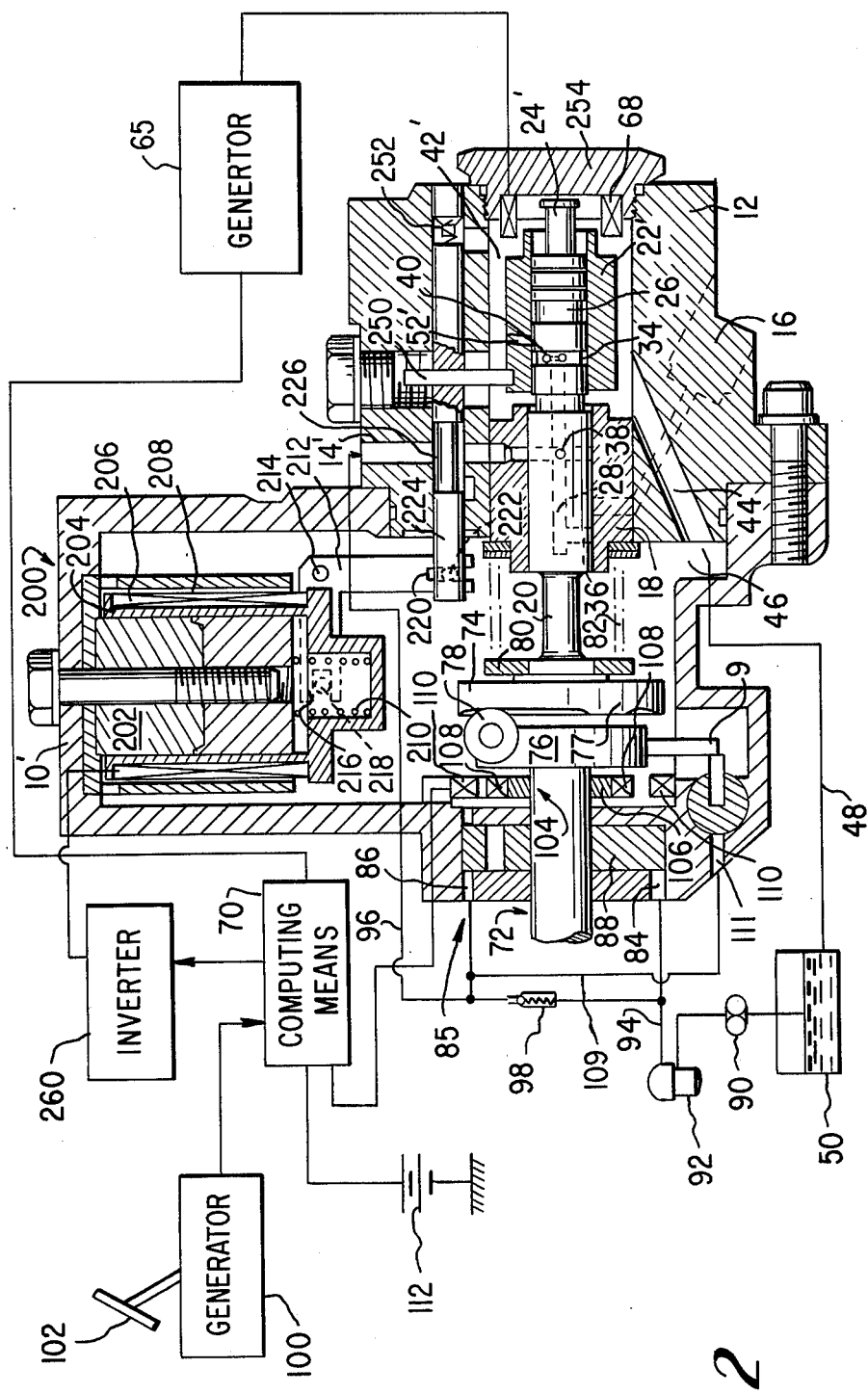
FIG. 2 is a logitudinal section of a second preferred embodiment of a fuel injection pump according to the present invention.

In the pump of FIG. 1, the actuator 54 is connected directly to the overflow member 22. It is of course possible to provide the actuator at a remote location and connect it to the overflow member by a linkage as shown in FIG. 2. The construction and operation is essentially similar to the embodiment shown in FIG. 1 with similar elements designated by the same reference numerals suffixed by an apostrophe, and only the modifications will be described hereinbelow.

An actuator 200 essentially similar to the actuator 54 is disposed perpendicular to the barrel 18 and has a magnetic core 202 and a guide cup 208 fixed to the casing 10'. A bobbin 204 wound with a coil 206 is movable up and down as viewed in FIG. 2 and is urged downward by a compression spring 210 disposed between the bottom of the bobbin 204 and the bottom of the core 202. A bellcrank lever 212 is pivotal about a pin 214 and is formed with a slot 216 in which a pin 218 fixed to the bobbin 204 is slidably received.

A slot 220 is formed in the other end of the bellcrank lever 212 in which a pin 222 fixed to a metering rod 224 is slidable. The metering rod 224 has a metering surface 226 which extends through the inlet port 14' for metering fuel. A compression backlash spring 252 urges the metering rod 224 leftward and a pin 250 connects the metering rod 224 to the overflow member 22'. The overflow passage 52' opens into the overflow chamber 42'. A threaded plug 254 closes the right end of the casing head 12', and the right end of the plug 24' is maintained in engagement with the plug 254.

In this embodiment the spring 210 urges the bobbin 204 downward and thereby the bellcrank lever 212 counterclockwise. This urges the metering rod 224 and overflow member 22' rightward toward a position of maximum fuel injection volume. Voltage applied to the actuator 200 thereby urges the overflow member 22' leftward toward a position of minimum fuel injection volume against the force of the spring 210. For this reason, an inverter 260 is disposed between the computing means 70 and the coil 206 of the actuator 200.

Figure 5:
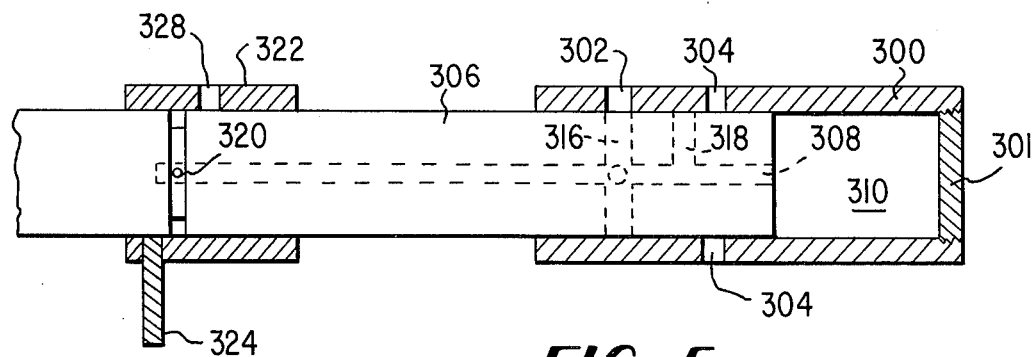
FIG. 5 is a fragmentary section of another embodiment of a fuel injection pump of the invention.

The scope of the invention is not limited to the particular configuration of the barrel 18, plunger 20 and overflow member 22 shown in FIG. 1 and in slightly modified form in FIG. 2. FIG. 5 shows an embodiment of the present invention in which the relative positions of the barrel and overflow member are reversed.

The right end of a barrel 300 is closed by a plug 301, and an inlet port 302 and an outlet port 304 are formed through the wall of the barrel 300. A plunger 306 is sealingly slidable in the bore of the barrel 300 and is formed with an axial passageway 308 opening into a compression chamber 310 defined within the barrel 300 by the right end of the plunger 306 and the left end of the plug 301. First and second radial passageways 316 and 318 communicate with the axial passageway 308. The plunger 306 is further formed with an annular groove 320 communicating with the axial passageway 308.

An overflow member 322 is provided with a bore (no numeral) in which the portion of the plunger 306 including the groove 320 is sealingly slidable. The overflow member 322 is movable left and right by means of a pin 324 connected through a linkage to an electrical actuator as shown in FIG. 2. Axially aligned ports 326 and 328 are formed through the wall of the overflow member 322. The port 328 is connected to a fluid reservoir (not shown).

In operation, the plunger 306 is moved to its leftmost position by a cam assembly such as shown in FIG. 1 during an intake stroke so that a passageway 316 aligns with the inlet port 302 and fuel is introduced into the compression chamber 310 through the radial passageway 316 and axial passageway 308. Rotatable rightward movement of the plunger 306 in the compression stroke causes the plunger 306 to block the port 302 and compress fuel in the compression chamber 310 and axial passageway 308. Further rightward movement of the plunger 306 causes the plunger 306 to uncover the port 304 so that fuel is forced to an injection nozzle through the axial passageway 308 and a radial passageway 318. Further rightward movement of the plunger 306 causes the groove 320 to align with the port 328. The compression chamber 310 is thereby connected to the reservoir through the axial passageway 308, annular groove 320 and port 328 to terminate fuel injection. The position of the overflow member 322 is controlled by a closed loop servo control system including the electric actuator as described with reference to FIGS. 1 to 4.

Although the present invention has been disclosed in the form of a distribution type pump, it will be clearly understood from the description that the novel features may be applied to a unit injection or combination pump. The computing means 70' especially is simple in design, and since it contains no non-linear elements, and requires no adjustment of precision calibration, it can be manufactured at extremely low cost as a single integrated circuit chip. If the engine is employed in a vehicle and the computing means 70 or 70' is powered by the vehicle battery 112, a voltage regulator may be easily and inexpensively incorporated thereinto. Numerous modifications will become immediately obvious to one skilled in the art which are within the scope of the present invention.

What is claimed is:
1. A fuel injection pump comprising:
   an enclosure;
   a pump element comprising a plunger rotatingly and reciprocally movable in the enclosure to define a compression chamber of variable volume, the pump element connecting the compression chamber to a fuel inlet during an intake stroke of the pump element and connecting the compression chamber to a fuel outlet during a compression stroke of the pump element;
   a movable overflow member for connecting the compression chamber to a fuel reservoir during the compression stroke of the pump element, the position of the pump element at which the overflow member connects the compression chamber to the fuel reservoir being variable in dependence on the position of the overflow member to determine the fuel injection volume, said movable overflow element being in direct sliding engagement with said plunger and including a bore in which said plunger is received;
   an electrical actuator having a linearly movable actuator element connected to move the overflow member, said electrical actuator member comprising a solenoid and said linearly movable actuator member comprising a coil of said solenoid; and
   a closed loop electrical servo control means for electrically controlling the electrical actuator to linearly move the actuator element to move the overflow member to a position corresponding to the required fuel injection volume.

2. The pump of claim 1, in which the servo control means comprises;
   a sensor to sense the position of the overflow member and generate an electrical feedback signal corresponding thereto;
   a command signal generator to generate a command signal corresponding to the required fuel injection volume; and
   computing means responsive to the command and feedback signals to electrically control the electrical actuator to move the overflow member to and maintain the overflow member in the position corresponding to the command signal.

3. The pump of claim 1, in which the servo control means comprises;
   a variable fuel injection command means to designate the required fuel injection volume; and
   computing means to compute the position of the overflow member corresponding to the required fuel injection volume designated by the fuel injection command means.

4. The pump of claim 3, in which the fuel injection command means is arranged to feed an electrical command signal to the computing means corresponding to the required fuel injection volume.

5. The pump of claim 1, in which the servo control means comprises;
   an engine speed command means to generate an engine speed command signal corresponding to the required engine speed;
   an engine speed sensor to generate an engine speed signal corresponding to engine speed; and
   computing means responsive to the engine speed command and engine speed signals to determine in response thereto the required fuel injection volume.

6. The pump of claim 1, in which the overflow member is formed with a bore, part of the pump element being slidable in the bore, the overflow member being formed with a passageway through which the compression chamber and the fuel reservoir are communicable and the pump element operatively controlling communication through the passageway.

7. The pump of claim 1, further comprising a linkage connecting the actuator element of the electrical actuator to the overflow member.

8. The pump of claim 1, in which the overflow member constitutes a movable part of the enclosure, the overflow member being formed with a bore in which an end of the pump element is slidable and a plug closing the end of the bore, the compression chamber being defined within the bore of the overflow member by the end of the pump element and the plug member.

9. The pump of claim 8, in which the pump element is a plunger formed with an axial passageway opening into the compression chamber, a first radial passageway communicating with the axial passageway and communicable with the fuel inlet during the intake stroke of the plunger, a second radial passageway communicating with the axial passageway and communicable with the fuel outlet during the compression stroke of the plunger and an annular groove communicating with the axial passageway, the overflow member being formed with a port communicating with the fuel reservoir and communicable with the annular groove during the compression stroke of the plunger.

* * * * *